United States Patent [19]

Gessell

[11] 4,172,050

[45] Oct. 23, 1979

[54] HIGH EFFICIENCY TITANATE CATALYST FOR POLYMERIZING OLEFINS

[75] Inventor: Donald E. Gessell, Baton Rouge, La.

[73] Assignee: The Dow Chemical Company, Midland, Mich.

[21] Appl. No.: 581,293

[22] Filed: May 27, 1975

Related U.S. Application Data

[63] Continuation-in-part of Ser. No. 463,213, Apr. 22, 1974, abandoned.

[51] Int. Cl.$^2$ ............................................. C08F 4/64
[52] U.S. Cl. ........................ 252/431 R; 252/429 C; 526/151
[58] Field of Search ....................... 252/431 R, 429 C

[56] References Cited

U.S. PATENT DOCUMENTS 3,737,393  6/1973  de Vries ........................ 252/431 R

FOREIGN PATENT DOCUMENTS 1235062  6/1971  United Kingdom ............... 252/431 R
1251177 10/1971  United Kingdom ............... 252/429 C

*Primary Examiner*—Patrick Garvin

[57] ABSTRACT

Compositions exhibiting high catalytic activity in the polymerization of α-olefins are provided by reacting an ester of titanium, a so-called titanate such as tetra(isopropoxy)titanium, an organomagnesium compound or complex such as a hydrocarbon soluble complex of dialkyl magnesium and an alkyl aluminum, e.g., di-n-butylmagnesium.1/6 triethylaluminum and an alkyl aluminum halide. Polymerization processes employing this catalyst composition do not require conventional catalyst removal steps in order to provide polymers having suitable color and other physical characteristics.

12 Claims, No Drawings

HIGH EFFICIENCY TITANATE CATALYST FOR POLYMERIZING OLEFINS

CROSS-REFERENCE TO RELATED APPLICATIONS

This application is a continuation-in-part application of application Ser. No. 463,213 filed Apr. 22, 1974 and now abandoned.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalysts to become rapidly depleted or deactivated by significantly higher temperatures that are normally employed in solution processes.

Recently, catalysts having higher efficiencies have been disclosed, e.g., U.S. Pat. Nos. 3,392,159, U.S. Pat. No. 3,737,393, Dutch Patent Application 7203108 and West German Patent application No. 2,231,982. While the increased efficiencies achieved by using these recent catalysts are significant, even higher efficiencies are desirable in order to more effectively control the polymerization at higher polymerization temperatures and the products made thereby.

In view of the foregoing problems encountered in the use of conventional Ziegler catalysts, it would be highly desirable to provide a polymerization catalyst which is sufficiently active, even at solution polymerization temperatures, to produce such high quantities of polymer per unit of catalyst that it is no longer necessary to remove catalyst residue in order to obtain a polymer of the desired purity.

SUMMARY OF THE INVENTION

The present invention, in one aspect, is (I) the catalytic reaction product of (A) an ester of tetravalent or trivalent titanium with (B) an intermediate reaction product of (a) an organomagnesium component and (b) a metallic halide or (II) the catalytic reaction product of (C) an intermediate reaction product of (c) an ester of tetravalent or trivalent titanium and (d) an organomagnesium component and (D) a metallic halide. The magnesium component is an organomagnesium compound or a complex of the organomagnesium compound and an organometallic compound which solubilizes the organomagensium compound in hydrocarbon. The metallic halide corresponds to the empirical formula $MR_{3-a}X_a$ wherein M is a metal of Group 3a, R is alkyl, alkoxy, aryl or aryloxy; X is halogen; and a is in the range from 1 to 3. The proportions of the foregoing components of said catalytic reaction products are such that the atomic ratio of Mg:Ti is greater than 10:1 up to about 200:1, the atomic ratio of M:Ti is within the range from about 10:1 to about 500:1, the atomic ratio of Mg:X is within the range from about 0.1:1 to about 1:1.

In a second aspect, the invention is a process for polymerizing an α-olefin under conditions characteristic of Ziegler polymerization wherein the aforementioned reaction product is employed as the sole catalyst or in combination with a common Ziegler catalyst activator such as an alkyl aluminum compound.

In view of the relatively low activity of conventional titanate catalysts in comparison with catalysts employing titanium halides or oxyhalides, it is indeed surprising that the aforementioned reaction product of titanate and organomagnesium compound or complex thereof is a high yield catalyst capable of producing more than a million weight parts of olefin polymer per weight part of titanium. Such compositions possess significantly greater catalyst activities than similar compositions wherein titanium halide is substituted for titanate. Accordingly, olefin polymers produced in accordance with the foregoing process generally contain lower amounts of titanium catalyst residues than polymers produced in the presence of conventional catalysts even after subjecting such polymers to catalyst removal treatments. Moreover, the novel reaction products of the present invention maintain a high catalyst efficiency, even at solution polymerization temperatures. Further, these catalytic reaction products enable a higher degree of control over the polymerization in order that a more uniform product can be made. Additionally, the polymer produced in the practice of the present invention has a very narrow molecular weight distribution, i.e., such polymers have a weight average ($M_w$) to number average ($M_n$) ratio less than 6, commonly from about 2 to about 3. Such polymers are highly useful in molding applications such as injection molding, film application and rotational molding.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the reaction product as hereinbefore described. The foregoing polymerization process is most beneficially carried out under inert atmosphere and relatively low temperature and pressure, although very high pressures are optionally employed.

Olefins which are suitably polymerized or copolymerized in the practice of this invention are generally the aliphatic α-monoolefins having from 2 to 18 carbon atoms. Illustratively, such α-olefins can include ethylene, propylene, butene-1, pentene-1, 3-methylbutene-1, hexene-1, octene-1, dodecene-1, octadecene-1 and the like. It is understood that α-olefins may be copolymerized with other α-olefins and/or with small amounts, i.e., up to about 10 weight percent based on the polymer, of other ethylenically unsaturated monomers such as butadiene, isoprene, cyclopentadiene, pentadiene-1,3, styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 10, especially from 0.1 to 5, weight percent based on the weight of the resulting polymer of propylene, butene-1 or similar higher α-olefin.

Most advantageously, the novel catalyst composition of the present invention is the reaction product of (A) an ester or partial ester of trivalent or tetravalent titanium and (B) an intermediate reaction product of an organomagnesium compound or a hydrocarbon soluble complex thereof with a metallic halide corresponding to the empirical formula $MR_{3-a}X_a$ wherein M is a metal of Group 3a of Mendeleev's Periodic Table of Elements; R is alkyl, alkoxy, aryl and aryloxy; X is halogen preferably chloride, bromide, and iodide, a is in the range of about 1 to 3, preferably from about 1 to 2. In embodiments less preferred than the preceding one wherein an organomagnesium compound is employed as the organomagnesium component, it is necessary that the metallic halide be an organometallic compound corresponding to the aforementioned empirical formula wherein a is from 1 to 2.1. In either case, the foregoing catalyst composition preferably has an atomic ratio of Mg:Ti in the range from about 20:1 to about 200:1, most preferably from about 40:1 to about 80:1, an atomic ratio of M:Ti in the range from preferably about 20:1 to about 200:1, most preferably from about 50:1 to about 150:1 and an atomic ratio of Mg:X in the range from about 0.1:1 to about 1:1, preferably from about 0.2:1 to about 0.7:1, most preferably from about 0.4:1 to 0.6:1.

The titanate is preferably an alkoxide or an aryloxide, especially an alkoxide having from 1 to 12 carbon atoms or a phenoxide, of trivalent or tetravalent titanium. Such titanates are preferably derived from halides of trivalent or tetravalent titanium wherein one or more halogen atoms are replaced by an alkoxy or aryloxy group. Alkyl titanates which are also suitably employed as the titanium ester are readily prepared by reacting an alkoxy titanium compound with magnesium alkyl. Exemplary preferred titanates include tetrabutoxytitanium, tetra(isopropoxy)titanium, diethoxytitanium bromide, dibutoxytitanium dichloride, n-butyl(triisopropoxy)titanium, ethyl dibutoxytitanium chloride, monoethoxytitanium trichloride, tetraphenoxytitanium and the like. Of the preferred titanates, the tetravalent ones wherein all halogen atoms are replaced by alkoxide are most preferred, with tetra(isopropoxy)titanium and tetrabutoxytitanium being especially preferred.

Preferably the organomagnesium compound is dihydrocarbylmagnesium such as the magnesium dialkyls and the magnesium diaryls. Exemplary suitable magnesium dialkyls include dibutylmagnesium, dipropylmagnesium, diethylmagnesium, dihexylmagnesium, propylbutylmagnesium and others wherein alkyl has from 1 to 20 carbon atoms. Exemplary suitable magnesium diaryls include diphenylmagnesium, dibenzylmagnesium, and ditolylmagnesium, with the dialkylmagnesiums such as dibutylmagnesium, being especially preferred. Also suitable organomagnesium compounds are alkyl and aryl magnesium halides and alkyl and aryl magnesium alkoxides and aryloxides with the latter being advantageous in that they are soluble in hydrocarbon.

The metallic halides of the formula set forth hereinbefore are organometallic halides and metal halides wherein the metal is in Group 3a of Mendeleev's Periodic Table of Elements. Alkylaluminum halides of the formula $AlR_{3-a}X_a$ wherein R is alkyl, and X and a are as defined hereinbefore. Exemplary preferred alkylaluminum halides are ethylaluminum sesquichloride, diethylaluminum chloride, ethylaluminum dichloride, and diethylaluminum bromide, with ethylaluminum sesquichloride being especially preferred. Alternatively, a metal halide such as aluminum trichloride or a combination of aluminum trichloride with an alkyl aluminum halide or a trialkyl aluminum compound may be suitably employed.

In preferred practices of the present invention, it is beneficial if the intermediate reaction product of the aluminum halide compound and the organomagnesium component, preferably the organomagnesium complex, is mixed with the titanate compound. In most preferred practice, the organomagnesium complex, empirically illustrated as $MgR_2 \cdot xAlR_3$ wherein R is hydrocarbyl and x is about 0.01 to 10, especially from about 0.15 to about 2.5, is prepared by reacting particulate magnesium such as magnesium turnings or magnesium particles with about a stoichiometric amount of hydrocarbyl halide, illustrated as RX. The resulting hydrocarbon insoluble $MgR_2$ is then solubilized by adding $AlR_3$ and forming the hydrocarbon soluble organomagnesium complex. The amount of $AlR_3$ which is added to the $MgR_2$ to form the organomagnesium complex should be enough to solubilize a significant amount of $MgR_2$, e.g., at least 5 weight percent of $MgR_2$ is solubilized. It is preferred to solubilize at least 50 weight percent of the $MgR_2$ and especially preferred to solubilize all of $MgR_2$. In suitable embodiments, other organometallic compounds such as organozinc compounds and mixtures thereof which solubilize the organomagnesium compound in hydrocarbon are substituted in part or in total for $AlR_3$ usually in amount sufficient to produce an atomic ratio of 0.01:1 to 10:1 of metal to magnesium.

The hydrocarbon solution of the organomagnesium complex is preferably combined with the metallic halide, preferably an organoaluminum halide, by adding the solution of the complex to organoaluminum halide, advantageously dispersed in a hydrocarbon diluent. Alternatively, the desired reaction product may be formed by mixing the complex with a metal halide such as aluminum trihalide or a combination thereof with an organoaluminum halide or hydrocarbyl aluminum compound such as a trialkyl aluminum. The reaction between the hydrocarbon soluble organomagnesium complex and the organometallic halide or a metal halide causes the formation of a finely divided insoluble material. This intermediate reaction product now contains hydrocarbon insoluble portions as well as soluble portions. In the case of the organoaluminum halide or the aluminum halide the amount of the halide added to the organomagnesium complex is sufficient to provide an atomic ratio of Mg:X of from about 0.1:1 to about 1:1, preferably from about 0.2:1 to about 0.7:1, especially from about 0.4:1 to about 0.6:1.

The aforementioned intermediate reaction product is mixed with an amount of titanate, preferably by adding the titanate to the intermediate reaction product, to provide a catalytic reaction product having an atomic ratio of Al:Ti in the range from about 20:1 to 200:1, most preferably from 50:1 to 150:1 and an atomic ratio of Mg:Ti in the range from 20:1 to 200:1, most preferably from 40:1 to 80:1.

While the catalytic reaction product prepared in the foregoing manner is especially preferred in the practice of this invention, a suitable reaction product can be prepared by reacting an organomagnesium compound as defined hereinbefore with the metallic halide, $MR_{3-a}X_a$, as defined hereinbefore and subsequently reacting the intermediate reaction product with titanate in the proportions specified hereinbefore. As a further alternative method, a suitable catalytic reaction product may be prepared by mixing an organomagnesium component with titanate to form an intermediate reaction product thereof and subsequently reacting this intermediate product with the metallic halide, $MR_{3-a}X_a$. Also, a suitable catalytic reaction product is readily formed by first mixing the titanate and the metallic halide, preferably alkyl aluminum halide, and subsequently combining the mixture with the magnesium component. The mixture of titanate and metallic halide is optionally washed to remove organic soluble components prior to combination with the magnesium component.

In the preparation of the foregoing catalytic reaction products, it is preferred to carry out such preparation in the presence of an inert diluent. The concentrations of catalyst components are preferably such that when the metallic halide, e.g., alkyl aluminum halide, and the magnesium component are combined the resultant slurry is from about 0.005 to about 0.1 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −50° to about 150° C., preferably from about 0° to about 50° C. The period of mixing is not considered to be critical as it is found that a sufficient catalyst composition most often occurs within about 1 minute or less.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 250° C., preferably at solution polymerization temperatures, e.g., from about 110° to about 190° C. for a residence time of about 10 minutes to several hours, preferably 15 minutes to 1 hour. It is generally desirable to carry out the polymerization in the absence of moisture and oxygen and a catalytic amount of the catalytic reaction product is generally within the range from about 0.0001 to about 0.01 milligram-atoms titanium per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined as hereinbefore.

The polymerization pressures preferably employed are relatively low, e.g., from about 100 to about 500 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain on ethylene concentration in the solvent in the range from about 1 to about 10 weight percent, most advantageously from 1.2 to 2 weight percent. To achieve this concentration when an excess of ethylene is fed into the system, a portion of the ethylene can be vented.

Hydrogen is often employed in the practice of this invention to lower molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalyst composition and monomer together with intimate agitation provided by suitable stirring or other means. Agitation can be continued during polymerization, or in some instances, the polymerization can be allowed to remain unstirred while polymerization takes place. In the case of more rapid reactions with more active catalysts, means can be provided for refluxing monomer and solvent, if any of the latter is present and thus remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue and to possess a very narrow molecular weight distribution.

The following examples are given to illustrate the invention, and should not be construed as limiting its scope. All parts and percentages are by weight unless otherwise indicated.

General Operating Procedure for Working Examples

In the following examples the catalyst preparations are carried out in the absence of oxygen or water in a nitrogen filled gloved box. The catalyst components are used as diluted solutions in either n-heptane or Isopar E ® (a mixture of saturated isoparaffins having 8 to 9 carbon atoms). The polymerization reactions are carried out in a one gallon stainless steel stirred batch reactor at 150° C. unless otherwise stated. In such polymerization reactions two liters of dry oxygen-free Isopar E ® are added to the reactor and heated to 150° C. The reactor is vented to about 25 psig and 15 to 20 psi of hydrogen is added for polymer molecular weight control. Then, 120 psi of ethylene is added to the reactor and the ethylene pressure is set to maintain the reactor pressure at 155 to 165 psig. The catalyst is then pressured into the reactor using nitrogen and the reactor temperature is maintained for the desired polymerization time. The polymerization reactor contents are dumped into a stainless steel beaker and allowed to cool. The resulting slurry is filtered and the polymer dried and weighed. The ethylene consumption during polymerization is recorded with a DP cell which shows the rate of polymerization and the amount of polymer produced.

EXAMPLE 1

A catalyst is prepared by adding 9.4 ml of 0.1 M di(n-butyl)magnesium.1/6 triethylaluminum to a solution of 1.3 ml of 1.27 M ethylaluminum sesquichloride and 87 ml of Isopar E ®. To the resultant slurry is added 2.5 ml of 0.005 M tetra(isopropoxy)titanium. Twenty milliliters of this catalyst is added to the polymerization reactor and after 50 minutes, 145 grams of linear polyethylene is formed to give a catalyst efficiency of $1.21 \times 10^6$ grams of polymer per gram of titanium.

EXAMPLE 2

A catalyst is prepared by adding 2.2 ml of 0.26 M di(n-butyl)magnesium.1/6 triethylaluminum to a solution of 0.75 ml of 1.27 M ethylaluminum sesquichloride and 96 ml Isopar E ®. To the resultant catalyst slurry is added 0.5 ml of 0.05 M tetra(isopropoxy)titanium. Twenty milliliters of this catalyst is added to the polymerization reactor and after 70 minutes the reactor contents are dumped into a stainless steel beaker. After cooling the polymer slurry is filtered and placed in a vacuum oven at 120° C. overnight. The yield of polymer is 321.4 grams indicating a catalyst efficiency of $1.34 \times 10^6$ grams of polymer per gram of titanium.

EXAMPLE 3

A catalyst is prepared by adding 2.5 ml of 0.005 M tetra(isopropoxy)titanium to a slurry of 9.4 ml of 0.1 M diphenylmagnesium (hydrocarbon insoluble) and 86 ml of Isopar E ®. To the resultant slurry is added 1.3 ml of 1.27 M ethylaluminum sesquichloride. Twenty milliliters of the resultant catalyst is added to the polymerization reactor and ethylene polymerization lasts for 22 minutes. After cooling, filtering and drying the polymer solution, 37.3 g of polyethylene is obtained indicating a catalyst efficiency of 311,000 grams of polymer per gram of titanium.

EXAMPLE 4

A catalyst is prepared by adding 9.4 ml of 0.1 M diphenylmagnesium to a solution of 1.3 ml of 1.27 M ethylaluminum sesquichloride (EAS) and 86 ml of Isopar E ®. To this slurry is added 2.5 ml of 0.005 M tetraisopropoxytitanium. Twenty milliliters of the resultant catalyst is added to the reactor. After one hour the reactor contents are cooled, filtered and the polymer dried to obtain 188 grams of polyethylene indicating a catalyst efficiency of $1.57 \times 10^6$ grams of polymer per gram of titanium.

Comparison of the results of Examples 3 and 4 establishes that addition of the organomagnesium compound to metal halide (EAS) prior to addition of titanate, as in this example, is much preferred to the addition procedure of Example 3.

EXAMPLE 5

Following the procedure of Example 2, except using a reactor temperature of 70° C. and terminating the polymerization after 55 minutes, 183.8 grams of polyethylene are obtained indicating a catalyst efficiency of 768,000 grams of polymer per gram of titanium.

EXAMPLE 6

A catalyst is prepared by adding 1.26 ml of 1.31 M ethylaluminum dichloride to a solution of 1.30 ml of 0.648 M di(n-butyl)magnesium.1/6 aluminum triethyl and 95 ml of Isopar E ®. To the resultant slurry is added 2.5 ml of 0.005 M tetra(isopropoxy)titanium. Twenty milliliters of the catalyst is added to the reactor and the reaction terminated after one hour. After drying, 157.4 grams of polymer are obtained indicating a catalyst efficiency of $1.31 \times 10^6$ grams of polymer per gram of titanium.

EXAMPLE 7

A catalyst is prepared by adding 1.7 ml of 0.36 M di(n-butyl)magnesium.0.28 aluminum triethyl to a solution of 35.3 ml Isopar E ® and 1.4 ml of 0.63 M ethylaluminum sesquichloride. To the resultant slurry is added 1.6 ml of 0.005 M tetra(isopropoxy)titanium. Ten milliliters of this catalyst is added to the polymerization reactor and after 30 minutes 116.5 grams of dry polymer is obtained indicating a catalyst efficiency of $1.22 \times 10^6$ grams of polymer per gram of titanium.

For the purpose of comparison, several runs are prepared employing different ingredients as indicated.

First, a catalyst is prepared by adding 4 ml of 0.5 M aluminum triethyl to a solution of 4 ml of 0.5 M of titanium tetrachloride and 32 ml of Isopar E ®. Five milliliters of the resultant catalyst slurry is added to the reactor and the polymerization reaction is terminated after 30 minutes. A yield of 138 grams of polyethylene is obtained indicating a catalyst efficiency of 11,600 grams of polymer of gram of titanium. In a second comparative run, the first comparative run is repeated except that 4 ml of 0.5 M of tetra(isopropoxy)titanium is substituted for the 4 ml of 0.5 M titanium tetrachloride. No polymer can be recovered by filtration by subjecting the polymerization recipe to the conditions of the foregoing comparative example thus indicating a catalyst efficiency of 0. In a third comparative run similar to Example 7 except that titanium tetrachloride is substituted for the titanate, a catalyst is prepared by adding 1.7 ml of 0.36 M di(n-butyl)magnesium.0.28 aluminum triethyl to a solution of 35.3 ml of Isopar E ® and 1.4 ml of 0.63 M ethylaluminum sesquichloride. To the resultant slurry is added 1.6 ml of 0.005 titanium tetrachloride. Ten milliliters of this resultant catalyst slurry is added to the polymerization reactor and polymerization is terminated after 30 minutes. A yield of 51.8 grams of dry polymer is obtained indicating a catalyst efficiency of 541,000 grams of polymer per gram of titanium.

As evidenced by the foregoing comparative data, substantial and surprisingly high catalyst efficiencies are obtained by employing the catalyst composition of the present invention even though it requires the much less reactive titanate as compared to the titanium tetrahalide.

EXAMPLE 8

A catalyst is prepared by adding 143 pounds of solution of 0.70 M di(n-butyl)magnesium and 0.12 M aluminum triethyl and Isopar E ® to a solution of 211 pounds of Isopar E ® and 138 pounds of a 15 weight percent solution of ethylaluminum sesquichloride in Isopar E ®. To the resultant slurry is added 322 ml of tetra(isopropoxy)titanium. This catalyst is added continuously to a 250 gallon reactor along with 100 lbs/hr of ethylene and Isopar E ®. The amounts of catalyst and Isopar E ® are varied to maintain a reactor temperature of 150° C. Hydrogen is added to the reactor to control molecular weight of the polymer such that the polymer has a Melt Index of 2.5 to 12 decigrams per minute as determined by ASTM D-1238-65T (Condition E). The catalyst efficiency of the foregoing polymerization is $13.7 \times 10^6$ grams of polymer per gram of titanium.

EXAMPLE 9

Several catalysts as more specifically described in Table I are prepared by the general procedures described hereinbefore. The several catalysts are employed in several polymerization runs carried out under a nitrogen atmosphere in a one liter stirred batch reactor under, slurry polymerization conditions as follows:
temperature of 85° C.
ethylene partial pressure of 100 psi
hydrogen partial pressure of 25-50 psi
diluent—0.5 liter of hexane Accordingly, in each run the particular catalyst is charged to the reactor under nitrogen and at room temperature (~25° C.). The reactor is heated to 85° C. and vented to 20 psig. Ethylene and hydrogen are introduced into the reactor and reactor pressure is maintained at 170 psig by the amount of ethylene being fed into the reactor. The catalysts efficiencies are reported in Table I.

TABLE I

| Run No. | Catalyst Order of Addition(1) | Al:Mg:Ti Atomic Ratios | Catalyst Efficiencies, of Polyethylene/g Ti $\times 10^{-6}$ |
|---|---|---|---|
| 1 | EAS/MgR$_2$Ti(OiPr)$_4$ | 135:75:1 | 1.01 |
| 2 | EAS/Ti(OiPr)$_4$/MgR$_2$ | 135:75:1 | 1.26 |
| 3 | MgR$_2$*/EAS/Ti(OiPr)$_4$ | 108:60:1 | .802 |
| 4 | MgR$_2$*EAS/R Ti(OiPr)$_3$** | 108:60:1 | .694 |
| 5 | MgR$_2$*/EAS/Ti(OiPr)$_4$ | 108:60:1 | .787 |

*MgR$_2$ and EAS mixed to form a slurry which is 0.25 M in magnesium. This slurry is then diluted by factor of 10-15 with hexane prior to addition of Ti(OiPr)$_4$.
**Alkyl titanate prepared by reaction of MgR$_2$ + 2Ti(OiPr)$_2$ → 2RTi(OiPr)$_3$ and used same day it is prepared.
(1)Components are added to a vessel hexane in order from left to right to form a catalyst composition which is 0.005 M with respect to Ti.
MgR$_2$-di-n-butylmagnesium . 1/6 triethylaluminum
EAS - ethyl aluminum sesquichloride
Ti(OiPr)$_4$ - tetra(isopropoxy)titanium In Run Nos. 4 and 5 of Table I, the resulting polyethylene powders have bulk densities of 12-16 lbs/ft$^3$ whereas the polyethylene powders of Run Nos. 1-3 have bulk densities of 5-8 lbs/ft$^3$. The higher bulk densities of Run Nos. 4 and 5 are the result of employing a higher concentration of organomagnesium component in the final catalytic reaction product. Accordingly to achieve higher bulk densities, the magnesium component is concentrated as much as possible while still retaining a stirrable catalyst slurry. Usually, a concentration in the range of 0.1 to 0.3 molar with respect to magnesium is employed.

What is claimed is:

1. A catalyst consisting essentially of (I) catalytic reaction product of (A) an ester selected from an alkoxide or aryloxide of tetravalent or trivalent titanium with (B) an intermediate reaction product of (a) an organomagnesium component selected from an organomagnesium compound selected from a dihydrocarbyl magnesium, an alkyl magnesium alkoxide, an aryl magnesium aryloxide, an alkyl magnesium aryloxide or an aryl magnesium alkoxide or a hydrocarbon soluble complex of the dihydrocarbyl magnesium and an organometallic compound selected from a hydrocarbyl of aluminum or zinc which solubilizes the organomagnesium compound in hydrocarbon and (b) an alkyl aluminum halide or (II) a catalytic reaction product of (C) an intermediate reaction product of (c) the ester of tetravalent or trivalent titanium and (d) the organomagnesium component with (D) the alkyl aluminum halide, said alkyl aluminum halide corresponding to the empirical formula $MR_{3-a}X_a$ wherein M is aluminum, R is alkyl, X is halogen; and a is in the range from 1 to 3 provided that wherein the organomagnesium component is an organomagnesium compound a is in the range from 1 to 2.1, the proportions of the foregoing components of said catalytic reaction product being such that the atomic ratio of Mg:Ti is within the range from about 20:1 up to about 200:1, the atomic ratio of M:Ti is within the range from about 20:1 to about 200:1, the atomic ratio of Mg:X is within the range from about 0.1:1 to about 1:1, said catalyst being a suitable catalyst for the polymerization of aliphatic α-monoolefins.

2. The reaction product of claim 1 wherein the organomagnesium component is concentrated to a value from 0.1 molar with respect to magnesium up to the maximum concentration at which the reaction product in slurry form is still stirrable.

3. The reaction product of claim 1 wherein the organomagnesium component is a complex of dialkyl magnesium and a trialkyl aluminum wherein the atomic ratio of Al to Mg is within the range from about 0.1:1 to about 10:1.

4. The reaction product of claim 2 wherein the concentration of the organomagnesium component is from 0.1 to about 0.3 molar with respect to magnesium.

5. The reaction product of claim 1 wherein the catalytic reaction product has a Mg:Ti ratio in the range from about 40:1 to about 80:1, an Al:Ti ratio in the range from about 50:1 to about 150:1 and a Mg:X ratio from about 0.4:1 to about 0.6:1.

6. The reaction product of claim 1 which is the reaction product of the titanium alkoxide with an intermediate reaction product of the organomagnesium component and the alkyl aluminum halide and wherein the organomagnesium component is a hydrocarbon soluble complex of di(alkyl)magnesium and trialkyl aluminum and the alkoxide is a tetra(alkoxy)titanium and the alkyl aluminum halide has the formula $AlR_{3-a}X_a$ wherein a is from about 1 to 2.1.

7. The reaction product of claim 6 wherein the dialkyl magnesium is di(n-butyl)magnesium, the trialkyl aluminum is triethyl aluminum, the alkyl aluminum halide is ethyl aluminum sesquichloride, and the tetra(alkoxy)titanium is tetra(isopropoxy)titanium.

8. The reaction product of claim 7 wherein the Mg:Ti ratio is from about 40:1 to about 80:1, the atomic ratio of M:Ti is from about 50:1 to about 150:1 and the atomic ratio of Mg:X is from about 0.4:1 to 0.6:1.

9. The reaction product of claim 1 wherein the organomagnesium compound is a dihydrocarbyl magnesium, and the ester is an alkoxide of trivalent or tetravalent titanium.

10. The reaction product of claim 1 wherein the organomagnesium compound is a dihydrocarbyl magnesium, the organometallic compound is $AlR_3$ wherein R is hydrocarbyl, and the ester is an alkoxide of tetravalent titanium.

11. The reaction product of claim 10 wherein the magnesium component is concentrated to a value from 0.1 molar with respect to magnesium up to a maximum concentration at which the reaction product in slurry form is still stirrable.

12. The reaction product of claim 11 wherein the concentration of the magnesium component is from 0.1 to 0.3 molar with respect to magnesium.

* * * * *

UNITED STATES PATENT AND TRADEMARK OFFICE
CERTIFICATE OF CORRECTION

PATENT NO. : 4,172,050
DATED : October 23, 1979
INVENTOR(S) : Donald E. Gessell

It is certified that error appears in the above-identified patent and that said Letters Patent are hereby corrected as shown below:

Column 10, line 10, delete "100" and insert --110--.

Column 10, Table I, line 4, delete "EAS/MgR$_2$Ti(OiPr)$_4$" and insert --EAS/MgR$_2$/Ti(OiPr)$_4$--.

Column 10, Table I, line 7, delete "MgR$_2$*EAS/RTi(OiPr)$_3$**" and insert --MgR$_2$*/EAS/RTi(OiPr)$_3$**--.

Signed and Sealed this

First Day of April 1980

[SEAL]

Attest:

Attesting Officer

SIDNEY A. DIAMOND

Commissioner of Patents and Trademarks